United States Patent
Chaudhary et al.

(10) Patent No.: US 6,225,364 B1
(45) Date of Patent: May 1, 2001

(54) FOAMS COMPRISING HFC-134 AND A LOW SOLUBILITY CO-BLOWING AGENT AND A PROCESS FOR MAKING

(75) Inventors: Bharat I. Chaudhary, Pearland, TX (US); Kyung W. Suh, Midland; Andrew N. Paquet, Saginaw, both of MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/581,337

(22) PCT Filed: Dec. 11, 1998

(86) PCT No.: PCT/US98/26322

§ 371 Date: Aug. 1, 2000

§ 102(e) Date: Aug. 1, 2000

(87) PCT Pub. No.: WO99/31170

PCT Pub. Date: Jun. 24, 1999

Related U.S. Application Data

(60) Provisional application No. 60/069,983, filed on Dec. 18, 1997.

(51) Int. Cl.[7] .................................. C08J 9/12; C08J 9/14
(52) U.S. Cl. ................................ 521/82; 521/79; 521/94; 521/97; 521/131; 521/146; 521/910; 264/53; 264/DIG. 4

(58) Field of Search .................................. 521/79, 98, 82, 521/97, 94, 131, 146

(56) References Cited

U.S. PATENT DOCUMENTS

| 5,182,040 | 1/1993 | Bartlett et al. ......................... 252/67 |
| 5,278,196 | 1/1994 | Robin et al. ........................... 521/98 |

FOREIGN PATENT DOCUMENTS

| 1086450 | 9/1980 | (CA) ..................................... 403/76 |
| 5-287111 | 11/1993 | (JP) .................................. C08J/9/14 |

*Primary Examiner*—Morton Foelak

(57) ABSTRACT

Disclosed is an extruded, dimensionally stable, closed cell alkenyl aromatic polymer foam. The foam comprises an alkenyl aromatic polymer material greater than 50 percent by weight of alkenyl aromatic monomeric units. The foam has a density of about 16 to about 64 kilograms per cubic meter. The foam has a thickness in cross section of 15 millimeters or more. The foam has a blowing agent composition comprising a primary blowing agent of about 70 to about 95 weight percent 1,1,2,2-tetrafluoroethane and a secondary blowing agent comprising about 30 to about 5 weight percent based upon the total moles of the blowing agent composition. The secondary blowing agent being selected from the group consisting essentially of 1,1,1,2-tetrafluoroethane, carbon dioxide, nitrogen, argon, and water. Further disclosed is a process for making the foam.

7 Claims, No Drawings

US 6,225,364 B1

FOAMS COMPRISING HFC-134 AND A LOW SOLUBILITY CO-BLOWING AGENT AND A PROCESS FOR MAKING

This application is a Rule 371 of PCT/US98/26322 of Dec. 11, 1998, which claims the benefit of U.S. Provisional Application No. 60/069,983 filed Dec. 18, 1997.

BACKGROUND OF THE INVENTION

The invention relates to extruded alkenyl aromatic polymer foams comprising a blend of 1,1,2,2-tetrafluoroethane (HFC 134) and a low solubility co-blowing agent and a process for making.

Due to increasingly stringent environmental regulations, manufacturers of alkenyl aromatic polymer insulating foams are considering fluorocarbons as potential insulating cell gas agents (blowing agents). One such agent is HFC 134.

HFC 134 is known in the art as a blowing agent for making alkenyl aromatic polymer foams. HFC 134 is disclosed in Canadian Patent 1,086,450; Japanese Published Application 5-287111; and U.S. Pat. Nos. 5,278,196 and 5,182,040.

When selecting a blowing agent for insulating alkenyl aromatic polymer foams, the amount of insulating blowing agent must be high enough to provide adequate insulating performance but not high enough to result in undesirable physical properties in the foam product.

A problem with using HFC 134 as a blowing agent is that at levels required to maintain desirable foam insulating performance (i.e. about 70 weight percent or more based upon the total moles of blowing agent), poor dimensional stability is observed when producing closed cell alkenyl aromatic polymer foams of low density (i.e. about 16 to about 64 kilograms per cubic meter) and thick cross-section (i.e. about 15 millimeters or more).

The prior art does not effectively address the dimensional stability problem associated with use of high levels of HFC 134 in blowing agents when making closed cell alkenyl aromatic polymer foams of low density and thick cross-section.

Canadian Patent No. 1,086,450 relates extruded alkenyl aromatic polymer foams made with 30 to 70 weight percent of a low permeability blowing agent such as HFC 134 and a high permeability co-blowing agent such as flourochloromethane, methyl chloride, ethyl chloride, chlorodifluoromethane, and 1,1-difluoroethane. The Canadian patent avoids the above problem when it employs significantly lower levels of HFC 134. The disclosed co-blowing agents are very soluble in alkenyl aromatic polymers and negatively impact foam dimensional stability when employed with HFC 134 in blowing agent compositions comprising about 70 weight percent or more of HFC 134.

Japan Published Application 5-287111 relates extruded polystyrene foams made with a blowing agent of HFC 134 and 2-chloro-1,1,1,2-tetraflouroethane (HCFC 124) in an 80/20 ratio by weight. Although the dimensional stability of the disclosed foams is not described, use of such blowing agents would result in dimensionally unstable foams due to the high solubility of HCFC 124 in polystyrene and its slow permeation rate through polystyrene foams.

U.S. Pat. No. 5,182,040 relates azeotropic and near-azeotropic compositions described as useful as blowing agents in polymer foams among other uses. The compositions comprise HFC 134 and a co-blowing agent selected from among 1,1-difluoroethene (HFC 152a); 1-chloro-1,1-difluoroethane (HCFC 142b); dimethyl ether (DME); 1,1,1,2,3,3,3,-heptafluoropropane (HFC 227ea); perfluorocyclobutane (HFC 318); n-butane; or isobutane. A specific foam embodiment of a polystyrene foam blown with a composition of 60–99 weight percent HFC 134 and 1–40 weight percent DME of certain physical properties (claim 1). Although the dimensional stability of any possible foams is not described, use of such co-blowing agents with about 70 weight percent or more HFC 134 would result in dimensionally unstable foams due to their high solubility in polystyrene and, in the case of some of the co-blowing agents, their slow permeation rate through polystyrene foams. Further, DME is very flammable.

U.S. Pat. No. 5,278,196 relates plastic foams blown with a composition of 1,1,1,2,3,3,3-heptafluoropropane (HFC 227ea) and HFC 134 (claim 7). The reference does not describe a dimensionally stable, low density, extruded polystyrene foam blown with a composition comprising about 70 weight percent or more of HFC 134.

It was found surprising that a dimensionally stable, low density, extruded alkenyl aromatic polymer foam of low density and thick cross-section could be produced with a blowing agent formulation comprising about 70 weight percent or more of HFC 134a.

SUMMARY OF THE INVENTION

According to the present invention, there is an extruded, dimensionally stable, closed cell alkenyl aromatic polymer foam. The foam comprises an alkenyl aromatic polymer material greater than 50 percent by weight of alkenyl aromatic monomeric units. The foam has a density of about 16 to about 64 kilograms per cubic meter. The foam has a thickness in cross-section of 15 millimeters or more. The foam has a blowing agent composition comprising a primary blowing agent of about 70 to about 95 weight percent 1,1,2,2-tetrafluoroethane and a secondary blowing agent comprising about 30 to about 5 weight percent based upon the total moles of the blowing agent composition. Useful secondary blowing agent may have a vapor pressure of about 100 psia or more at 25 degrees Celsius. Useful secondary blowing agents having such a vapor pressure level include 1,1,1,2-tetrafluoroethane, carbon dioxide, nitrogen, helium, and argon. A useful secondary blowing agent not having such a vapor pressure level is water. The foam exhibits excellent dimensional stability.

According to the present invention, there is a process for making foam described above. The process comprises a) heating a alkenyl aromatic polymer material comprising greater than 50 percent by weight alkenyl aromatic monomeric units to form a melt polymer material; b) incorporating into the melt polymer material at an elevated pressure the blowing agent composition described above; c) the foamable gel being cooled to an desired foaming temperature; and d) extruding the foamable gel through a die into a zone of reduced pressure to form the foam.

DETAILED DESCRIPTION

The present invention addresses the dimensional stability problem associated with use of high levels of HFC 134 in blowing agents when making closed cell alkenyl aromatic polymer foams of low density and thick cross-section. A secondary blowing agent is selected which has a low solubility in alkenyl aromatic polymers, especially polystyrene. The secondary blowing agent does not significantly plasticize the polymer matrix and render the foam susceptible to excessive expansion or contraction (collapse). Some useful secondary blowing agents have the additional desirable feature of permeating rapidly out of the foam. Rapid permeation out of the foam promotes dimensional stability in that it balances the permeation of air into the foam. The Internal cell gas pressure within the foam is more likely to remain stable or relatively stable over the long service life of the insulating foam. Maintenance of a relatively stable internal cell gas pressure makes expansion or contraction of the foam less likely.

Most useful secondary blowing agents have a vapor pressure of about 100 psia or more at 25 degrees Celsius. Since solubility of a blowing agent in a substrate polymer is difficult to measure precisely, vapor pressure was chosen as a physical property to characterize the blowing agent. Vapor pressure corresponds approximately to solubility since blowing agents which have high vapor pressures usually have low solubility in substrate polymers; conversely, blowing agents which have low vapor pressures usually have high solubility in substrate polymers. Useful secondary blowing agents will be employed at a level of at least about 5 weight percent based upon the total moles of the blowing agent composition. A useful secondary blowing agent which does not exhibit such a vapor pressure level is water.

Particularly useful secondary blowing agents include 1,1,1,2-tetrafluoroethane, carbon dioxide, nitrogen, helium, argon, water, and mixtures of the foregoing.

Particularly useful blowing agent combinations include HFC 134/HFC 134a and HFC 134/carbon dioxide.

The blowing agent composition may comprise other blowing agents useful in minor proportions as long as HFC 134 comprises at least about 70 weight percent and the secondary blowing agent comprises at least about 5 weight percent based upon the total moles of the blowing agent composition. Other blowing agents include physical blowing agents and chemical blowing agents. Useful physical blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1Ädichloro-2,2,2-trifluoroethane (HCFC-123) and 1Ächloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1Ätrifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4Ä oxybenzene sulfonyl-semicarbazide, p-toluene sulfonyl semicarbazide, barium azodicarboxylate, N,N'Ädimethyl-N,N'-dinitrosoterephthalamide, and trihydrazino triazine.

The amount of blowing agent incorporated into the polymer melt material to make a foam-forming polymer gel is from about 0.2 to about 5.0 gram-moles per kilogram of polymer, preferably from about 0.5 to about 3.0 gram-moles per kilogram of polymer, and most preferably from about 1.0 to 2.50 gram-moles per kilogram of polymer.

The present foam has a density of from about 16 to about 64 and most preferably from about 25 to about 48 kilograms per cubic meter according to ASTM D-1622-88. The foam has an average cell size of from about 0.1 to about 0.5 and preferably from about 0.2 to about 0.4 millimeters according to ASTM D3576-77.

The present foam is particularly suited to be formed into a plank, desirably one having a cross-sectional area of about 30 ÿsquare centimeters or more and a minor dimension in cross-section (thickness) of about 15 millimeters or more.

The present foam is closed cell. Preferably, the present foam is greater than 90 percent closed-cell according to ASTM D2856-87.

The present foam has excellent dimensional stability. The foam exhibits dimensional change in any direction of about four (4) percent or less according to ASTM D2126/C578.

The present foam comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably about 70 weight percent or more alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as C2–6 alkyl acids and esters, ionomeric derivatives, and C4–6 dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred structures comprise substantially (i.e., greater than 90 percent by weight and more preferably greater than 95 percent by weight) and most preferably entirely of polystyrene.

The present alkenyl aromatic polymer foam is generally prepared by heating an alkenyl aromatic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

In addition, a nucleating agent may be added in order to control the size of foam cells. Preferred nucleating agents include inorganic substances such as calcium carbonate, talc, clay, titanium dioxide, silica, barium stearate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

Various additives may be incorporated in the present foam structure such as inorganic fillers, pigments, antioxidants, acid scavengers, ultraviolet absorbers, flame retardants, processing aids, extrusion aids, and the like.

An infrared attenuating agent such as carbon black, titanium dioxide, or graphite may be added to the polymer melt or foamable gel during manufacture to yield an end product foam of low thermal conductivity. Loadings typically vary from about 2 to about 10 percent by weight based upon the weight of the alkenyl aromatic polymer material.

While embodiments of the foam composition and the process of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. An extruded, dimensionally stable, closed cell alkenyl aromatic polymer foam, comprising: an alkenyl aromatic polymer material comprising greater than 50 percent by weight of alkenyl aromatic monomeric units, the foam having a density of about 16 to about 64 kilograms per cubic meter, the foam having a thickness in cross-section of 15 millimeters or more, the foam having a blowing agent composition comprising a primary blowing agent of about 70 to about 95 weight percent 1,1,2,2-tetrafluoroethane and a secondary blowing agent comprising about 30 to about 5 weight percent based upon the total moles of the blowing agent composition, the secondary blowing agent being selected from the group consisting essentially of 1,1,1,2-tetrafluoroethane, carbon dioxide, nitrogen, argon, and water.

2. The foam of claim 1, wherein the secondary blowing agent is 1,1,1,2-tetrafluoroethane.

3. The foam of claim 1, wherein the secondary blowing agent is carbon dioxide.

4. The foam of claim 1, wherein the secondary blowing agent is nitrogen.

5. The foam of claim 1, wherein the secondary blowing agent is argon.

6. The foam of claim 1, wherein the secondary blowing agent is water.

7. The foam of claim 1, wherein the secondary blowing agent is has a vapor pressure of 100 psia or more at 25 degrees Celsius.

* * * * *